United States Patent
Huang et al.

(10) Patent No.: US 10,065,319 B2
(45) Date of Patent: Sep. 4, 2018

(54) TOOL CALIBRATION APPARATUS OF ROBOT MANIPULATOR

(71) Applicant: DELTA ELECTRONICS, INC., Taoyuan Hsien (TW)

(72) Inventors: Cheng-Hao Huang, Taoyuan Hsien (TW); Chih-Ming Hsu, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 147 days.

(21) Appl. No.: 15/146,725

(22) Filed: May 4, 2016

(65) Prior Publication Data

US 2017/0151670 A1    Jun. 1, 2017

Related U.S. Application Data

(60) Provisional application No. 62/260,924, filed on Nov. 30, 2015.

(30) Foreign Application Priority Data

Mar. 4, 2016   (TW) .............................. 105106637 A (51) Int. Cl.
  *G01B 13/00*   (2006.01)
  *B25J 9/16*    (2006.01)

(52) U.S. Cl.
  CPC ... *B25J 9/1692* (2013.01); *G05B 2219/39019* (2013.01)

(58) Field of Classification Search
  CPC ....... G01B 21/042; G01P 21/00; G01C 25/00; G01C 25/005; B25J 9/1692; G05B 2219/39019

USPC .......................................................... 73/1.79
See application file for complete search history.

(56) References Cited

U.S. PATENT DOCUMENTS

| | | | | |
|---|---|---|---|---|
| 5,134,781 A | * | 8/1992 | Baker | G01B 3/30 33/502 |
| 5,400,638 A | * | 3/1995 | Kim | B25J 9/1692 73/1.79 |
| 5,907,229 A | * | 5/1999 | Snell | B25J 9/1692 318/568.22 |
| 6,035,695 A | * | 3/2000 | Kim | B25J 9/1692 700/254 |

(Continued)

*Primary Examiner* — Eric S McCall
*Assistant Examiner* — Mohammed E Keramet-Amircola
(74) *Attorney, Agent, or Firm* — Kirton McConkie; Evan R. Witt (57) ABSTRACT

A tool calibration apparatus for a robot manipulator having a tool is disclosed. The tool calibration apparatus comprises a base, an X-axis measurement device, a Y-axis measurement device and a Z-axis measurement device. Each of the X-axis measurement device, the Y-axis measurement device and the Z-axis measurement device comprises a measuring plate and a sensor. The measuring plates of the X-axis measurement device, the Y-axis measurement device and the Z-axis measurement device move in a direction along the X-axis, Y-axis, and Z-axis, respectively. The sensors of the X-axis measurement device, the Y-axis measurement device and the Z-axis measurement device measure a displacement of the corresponding measuring plate. According to the displacements, information of a tool center point of the tool is acquired so as to calibrate the tool center point.

11 Claims, 12 Drawing Sheets

(56) References Cited

U.S. PATENT DOCUMENTS

| | | | | |
|---|---|---|---|---|
| 6,205,839 B1* | 3/2001 | Brogårdh | ............... | B25J 9/1692 |
| | | | | 318/568.16 |
| 6,226,884 B1* | 5/2001 | McMurtry | ........... | B23Q 1/5462 |
| | | | | 33/557 |
| 6,304,051 B1* | 10/2001 | Sagues | .............. | H01L 21/67259 |
| | | | | 318/568.11 |
| 6,434,449 B1 | 8/2002 | De Smet | | |
| 6,463,782 B1* | 10/2002 | Shen | ....................... | B25J 9/1692 |
| | | | | 73/1.79 |
| 6,812,665 B2* | 11/2004 | Gan | ....................... | B25J 9/1692 |
| | | | | 318/568.11 |
| 8,485,017 B1* | 7/2013 | Trompeter | ............. | B25J 9/1692 |
| | | | | 73/1.79 |
| 2002/0148275 A1* | 10/2002 | Abbe | ..................... | B25J 9/1692 |
| | | | | 73/1.01 |
| 2002/0157449 A1* | 10/2002 | Asanuma | ............. | G01B 21/042 |
| | | | | 73/1.79 |
| 2003/0046801 A1* | 3/2003 | Engstrom | ............... | B25B 5/003 |
| | | | | 29/281.4 |
| 2003/0056566 A1* | 3/2003 | Nashiki | .................. | B25J 9/1692 |
| | | | | 73/1.79 |
| 2006/0023938 A1* | 2/2006 | Ban | ....................... | B25J 9/1692 |
| | | | | 382/153 |
| 2009/0178464 A1* | 7/2009 | Uebel | .................... | B25J 9/1692 |
| | | | | 73/1.79 |
| 2011/0066393 A1* | 3/2011 | Groll | ..................... | B25J 9/1676 |
| | | | | 702/94 |
| 2011/0318126 A1* | 12/2011 | Cornelius | ............... | B23B 39/14 |
| | | | | 408/1 R |
| 2016/0189537 A1* | 6/2016 | Huang | .................. | A63H 30/04 |
| | | | | 340/12.5 |

* cited by examiner

TOOL CALIBRATION APPARATUS OF ROBOT MANIPULATOR

CROSS-REFERENCE TO RELATED APPLICATION

This application claims the benefit of U.S. Provisional Application No. 62/260,924 filed on Nov. 30, 2015, and entitled "TOOL CALIBRATION APPARATUS OF ROBOT MANIPULATOR", the entirety of which is hereby incorporated by reference.

FIELD OF THE INVENTION

The present invention relates to a tool calibration apparatus, and more particularly to a tool calibration apparatus of a robot manipulator.

BACKGROUND OF THE INVENTION

With increasing development of industries, various robots have been developed and widely used in people's daily life and industrial applications. Generally, robot manipulator is an important component of the robot and may be equipped with a tool on the end-effector thereof for performing required tasks. For example, the tool may be a welding tool, a drilling tool, a gripping tool, a milling tool, or a cutting tool. The tool secured to the end-effector of the robot manipulator has a defined tip point, called the Tool Center Point (hereinafter referred to as TCP). When the tool is mounted on the end-effector of the robot manipulator, the precise displacement variations of the TCP of the tool relative to the end-effector of the robot manipulator need to be acquired and defined in advance. Namely, the size of the tool must be measured when the tool is mounted to the robot manipulator. When the robot manipulator equipped with the tool performs the required task, the operated paths and positions of the robot can be automatically calibrated according to the acquired displacement variations for allowing the tool to be operated at the correct operated paths and positions.

At present, for facilitating to calibrate the TCP of the tool, a tool calibration apparatus is employed. The conventional tool calibration apparatus includes a frame body and a plurality of infrared sensors. When the tool is mounted on the end-effector of the robot manipulator, a tool calibration process is performed. Firstly, the tool is moved toward the tool calibration apparatus and a modeling and teaching process of the tool is performed. Namely, the robot manipulator drives the tool to move within the space defined by the frame of the tool calibration apparatus, and the tool calibration apparatus performs a teaching process and sets up a pattern of moving the tool according to the movement of the TCP. Consequently, when one tool is replaced with another one with similar type, the tool calibration apparatus can compare the displacement variations between the tools and allow the robot manipulator to compensate for the tool inaccuracy so as to achieve the tool calibration process.

However, the conventional tool calibration apparatus equipped with infrared sensors is extremely expensive. In addition, when one tool mounted to the robot manipulator is replaced with another one with similar type, the displacement variations of the TCP of the tool relative to the end effector of the robot manipulator can be acquired by the conventional tool calibration apparatus with infrared sensors. However, when one tool mounted to the robot manipulator is replaced with another one with different type, the displacement variations of the TCP of the tool relative to the end effector of the robot manipulator can't be acquired accurately by the conventional tool calibration apparatus with infrared sensors. Consequently, the accuracy of the tool calibration performed by the conventional tool calibration apparatus is degraded. In addition, the misalignment of the tool may shut down the entire production line and waste material, time and cost.

Therefore, there is a need of providing a tool calibration apparatus of a robot manipulator to obviate the drawbacks encountered from the prior arts.

SUMMARY OF THE INVENTION

It is an object of the present invention to provide a tool calibration apparatus of a robot manipulator with reduced cost and capable of being module-assembled. The displacement variations of the TCP of the tool relative to the end effector of the robot manipulator can be measured and acquired accurately by the inventive tool calibration apparatus, so that the robot manipulator can compensate for the tool inaccuracy rapidly to secure the correct operating position of the tool. Consequently, the operating time can be saved as comparing with manual calibration, and high-precision calibration of the tool can be achieved by using the inventive tool calibration apparatus.

In accordance with an aspect of the present invention, there is provided a tool calibration apparatus of a robot manipulator. The robot manipulator comprises a tool and drives the tool to move. The tool calibration apparatus comprises a base, an X-axis measurement device, a Y-axis measurement device and a Z-axis measurement device. The base comprises a concave. The X-axis measurement device is disposed on the base and comprises a first measuring plate and a first sensor. The first measuring plate moves in a direction along the X-axis, and the first sensor measures a first displacement of the first measuring plate when the tool drives the first measuring plate to move. The Y-axis measurement device is disposed on the base and close to one side of the X-axis measurement device and comprises a second measuring plate and a second sensor. The second measuring plate moves in a direction along the Y-axis, and the second sensor measures a second displacement of the second measuring plate when the tool drives the second measuring plate to move. The Z-axis measurement device is disposed in the concave and comprises two sides close to the X-axis measurement device and the Y-axis measurement device respectively, a third measuring plate and a third sensor. The third measuring plate moves in a direction along the Z-axis, and the third sensor measures a third displacement of the third measuring plate when the tool drives the third measuring plate to move. According to the first displacement, the second displacement and the third displacement acquired by moving the tool in the direction along the X-axis, the Y-axis and the Z-axis, information of a tool center point of the tool is acquired so as to calibrate the tool center point of the tool.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
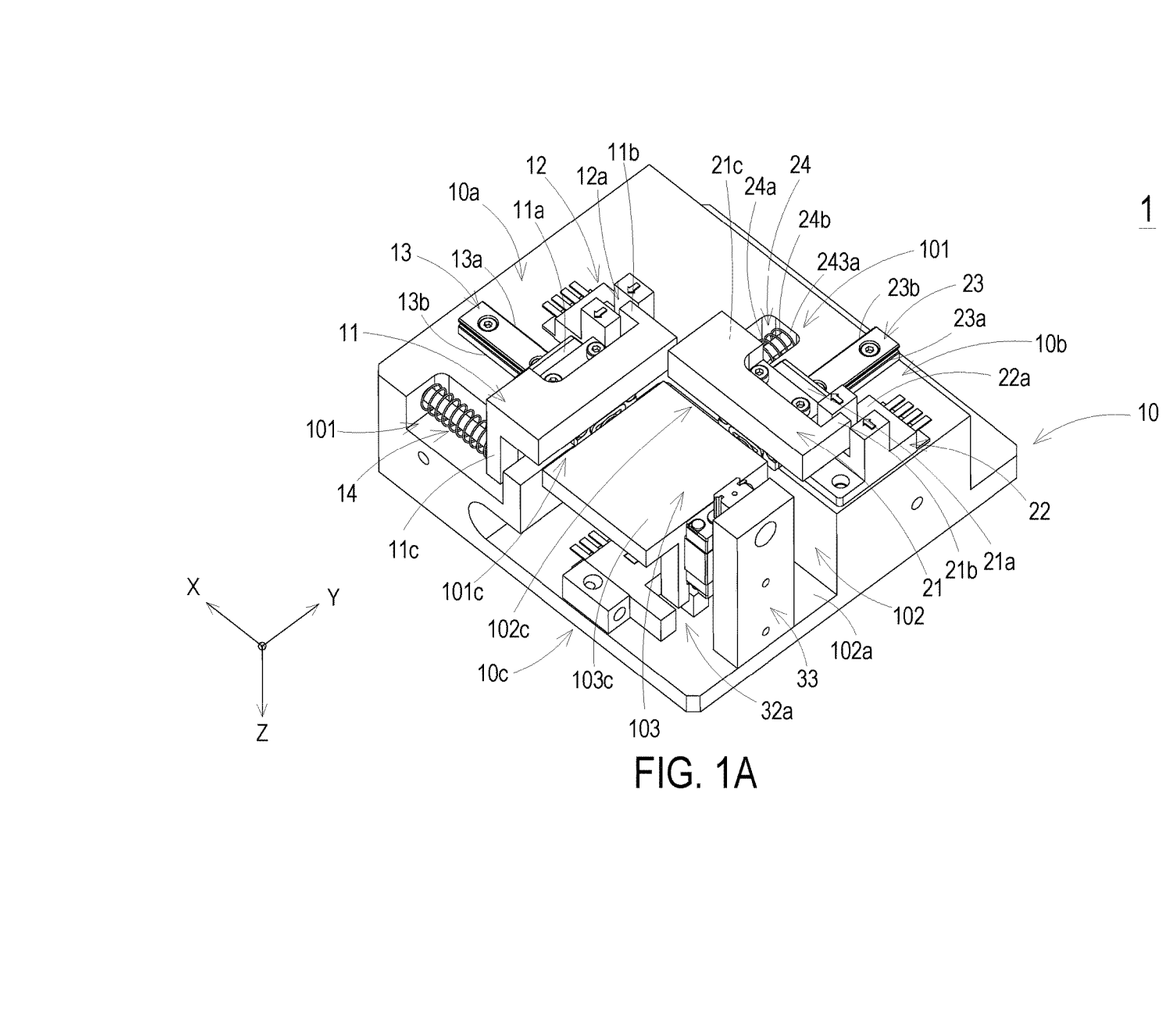
FIG. 1A is a schematic perspective view illustrating a tool calibration apparatus according to a first embodiment of the present invention.
Figure 1B:
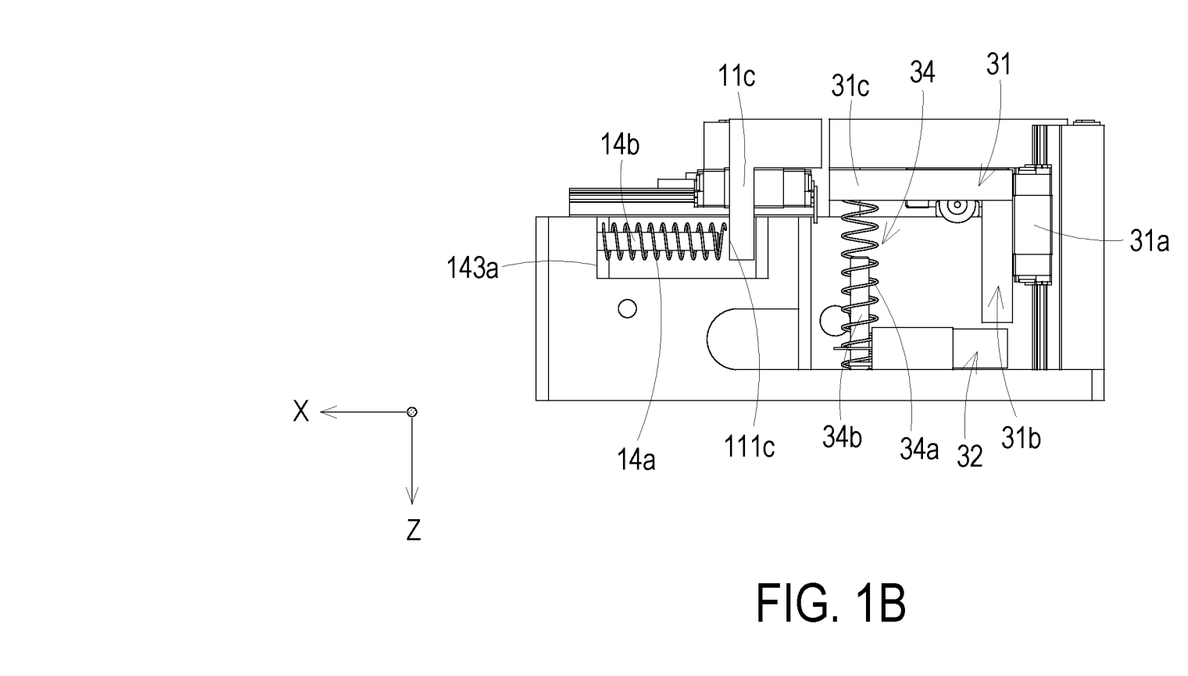
FIG. 1B is a schematic perspective view illustrating the tool calibration apparatus of FIG. 1A in different angle of view.
Figure 2A:
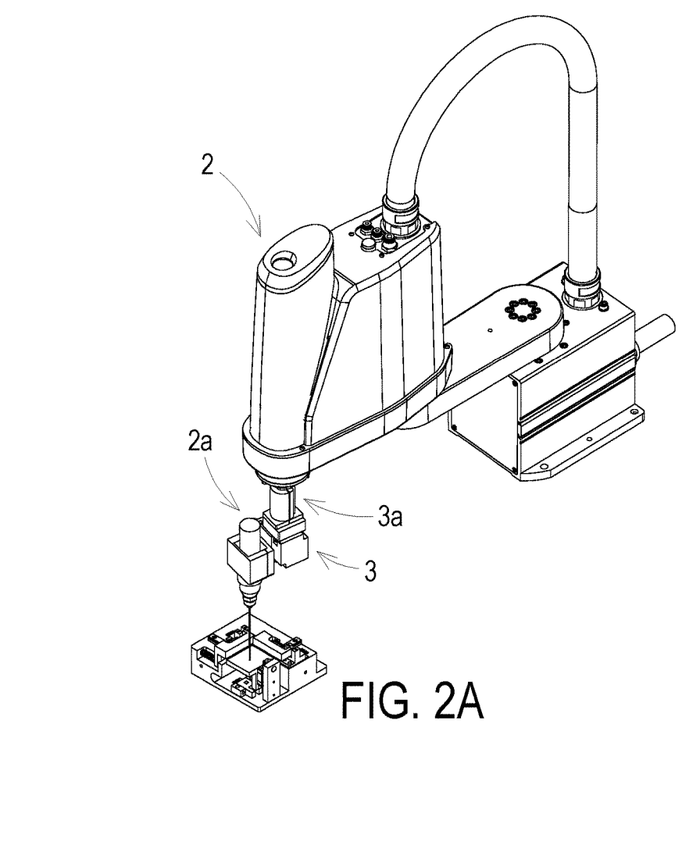
FIG. 2A is a schematic view showing that a tool mounted to the robot manipulator is applied to the tool calibration apparatus of the present invention.
Figure 2B:
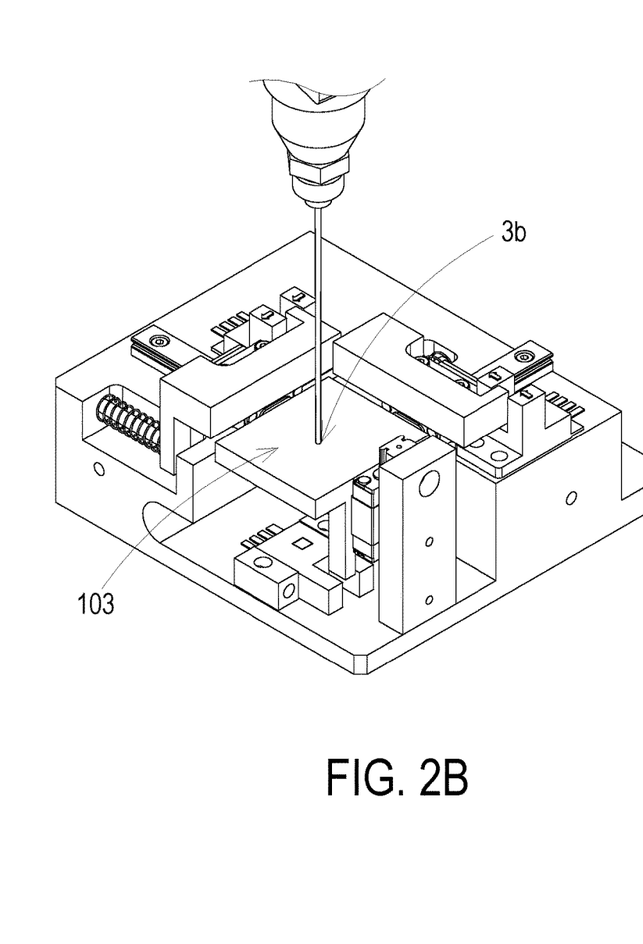
FIG. 2B is a partial enlargement schematic view of FIG. 2A.

FIG. 1A is a schematic perspective view illustrating a tool calibration apparatus of a robot manipulator according to a first embodiment of the present invention, FIG. 1B is a schematic perspective view illustrating the tool calibration apparatus of FIG. 1A in different angle of view, FIG. 2A is a schematic view showing that a tool mounted to the robot manipulator is applied to the tool calibration apparatus of the present invention, and FIG. 2B is a partial enlargement schematic view of FIG. 2A. As shown in FIGS. 1A, 1B, 2A and 2B, the tool calibration apparatus 1 is employed to calibrate the tool 3, which is mounted to the distal end of the robot manipulator 2, for ensuring that the tool 3 always be operated at the correct positions when the robot manipulator 2 performs a required task. Preferably but not exclusively, the robot manipulator is a selective compliance assembly robot arm (SCARA). The tool calibration apparatus 1 comprises a base 10, an X-axis measurement device 10a, a Y-axis measurement device 10b and a Z-axis measurement device 10c. The base 10 includes a plurality of recesses 101 and a concave 102. The X-axis measurement device 10a and the Y-axis measurement device 10b are disposed on the base 10, and the Z-axis measurement device 10c is disposed in the concave 102 of the base 10. One side of the X-axis measurement device 10a is close to one side of the Y-axis measurement device 10b, and the X-axis measurement device 10a and the Y-axis measurement device 10b are close to the first side 101c and the second side 102c of the Z-axis measurement device 10c, respectively. A portion of the X-axis measurement device 10a and a portion of the Y-axis measurement device 10b are higher than the top surface 103c of the Z-axis measurement device 10c. Consequently, a sensing space 103 can be defined by the X-axis measurement device 10a, the Y-axis measurement device 10b and the Z-axis measurement device 10c.

The X-axis measurement device 10a comprises a first measuring plate 11, a first sensor 12, a first linear rail 13 and a first elastic element 14. In this embodiment, the first sensor 12 is close to the first side 13a of the first linear rail 13, and the first elastic element 14 is close to the second side 13b of the first liner rail 13. The first measuring plate 11 includes a first sliding part 11a, a first measuring part 11b and a first sidewall 11c. The first measuring part 11b is aligned with and corresponding to the first sensor 12 so that the displacement of the first measuring part 11b can be measured by the first sensor 12. The first sensor 12 includes a first sensing groove 12a aligned with and corresponded to the first measuring part 11b of the first measuring plate 11 for allowing the first measuring part 11b of the first measuring plate 11 to be moved within the first sensing groove 12a. Consequently, the displacement of the first measuring part 11b can be measured and acquired by the first sensor 12. Preferably, the first sensor 12 is a position sensor or a displacement sensor. The first linear rail 13 is fastened on the top surface of the base 10, and the first sliding part 11a of the first measuring plate 11 and the first linear rail 13 are cooperated with each other, so that the first measuring plate 11 is slidably moved along the first linear rail 13. The first elastic element 14 is disposed in the corresponding recess 101 of the base 10 and includes a first spring 14a and a first post 14b. The first spring 14a is surrounding around the first post 14b, and the first spring 14a is corresponding to the first sidewall 11c of the first measuring plate 11. Namely, one end of the first spring 14a is urged against the outer surface 111c of the first sidewall 11c, and the other end of the first spring 14a is urged against a first side surface 143a of the recess 101. Consequently, when the first sidewall 11c of the first measuring plate 11 exerts a force upon the first spring 14a, the first spring 14a is compressed and an elastic restoring force is induced on the first spring 14a for allowing the first measuring plate 11 to be returned to the original position.

The Y-axis measurement device 10b comprises a second measuring plate 21, a second sensor 22, a second linear rail 23 and a second elastic element 24. In this embodiment, the second sensor 22 is close to the first side 23a of the second linear rail 23, and the second elastic element 24 is close to the second side 23b of the second liner rail 23. The second measuring plate 21 includes a second sliding part 21a, a second measuring part 21b and a second sidewall 21c. The second measuring part 21b is aligned with and corresponding to the second sensor 22 so that the displacement of the second measuring part 21b can be measured by the second sensor 22. The second sensor 22 includes a second sensing groove 22a aligned with and corresponded to the second measuring part 21b of the second measuring plate 21 for allowing the second measuring part 21b of the second measuring plate 21 to be moved within the second sensing groove 22a. Consequently, the displacement of the second measuring part 21b can be measured and acquired by the second sensor 22. Preferably, the second sensor 32 is a position sensor or a displacement sensor. The second linear rail 23 is fastened on the top surface of the base 10, and the second sliding part 21a of the second measuring plate 21 and the second linear rail 23 are cooperated with each other, so that the second measuring plate 21 is slidably moved along the second linear rail 23. The second elastic element 24 is disposed in the corresponding recess 101 of the base 10 and includes a second spring 24a and a second post 24b. The second spring 24a is surrounding around the second post 24b, and the second spring 24a is corresponding to the second sidewall 21c of the second measuring plate 21. Namely, one end of the second spring 24a is urged against the outer surface (not shown) of the second sidewall 21c, and the other end of the second spring 24a is urged against a first side surface 243a of the recess 101. Consequently, when the second sidewall 21c of the second measuring plate 21 exerts a force upon the second spring 24a, the second spring 24a is compressed and an elastic restoring force is induced on the second spring 24a for allowing the second measuring plate 21 to be returned to the original position.

The Z-axis measurement device 10c comprises a third measuring plate 31, a third sensor 32, a third linear rail 33 and a third elastic element 34. The third measuring plate 31 includes a third sliding part 31a, a third measuring part 31b and a third sidewall 31c. The third measuring part 31b is aligned with and corresponding to the third sensor 32 so that the displacement of the third measuring part 31b can be measured by the third sensor 32. The third sensor 32 is disposed in the bottom surface 102a of the concave 102 and includes a third sensing groove 32a aligned with and corresponded to the third measuring part 31b of the third measuring plate 31 for allowing the third measuring part 31b of the third measuring plate 31 to be moved within the third sensing groove 32a. Consequently, the displacement of the third measuring part 31b can be measured and acquired by the third sensor 32. Preferably, the third sensor 32 is a position sensor or a displacement sensor. The third linear rail 33 is close to the side edge of the concave 102, and the third sliding part 31a of the third measuring plate 31 and the third linear rail 33 are cooperated with each other, so that the third measuring plate 31 is slidably moved along the third linear rail 33. The third elastic element 34 is disposed on the bottom surface 102 of the concave 102 and includes a third spring 34a and a third post 34b. The third post 34b is vertically connected to the bottom surface 102a of the concave 102. The third spring 34a is surrounding around the third post 34b, and the third spring 34a is corresponding to the third sidewall 31c of the third measuring plate 31. Namely, one end of the third spring 34a is urged against the surface of the third sidewall 31c, and the other end of the third spring 34a is urged against the bottom surface 102a of the concave 102. Consequently, when the third sidewall 31c of the third measuring plate 31 exerts a force upon the third spring 34a, the third spring 34a is compressed and an elastic restoring force is induced on the third spring 34a for allowing the third measuring plate 31 to be returned to the original position.

The tool 3 includes a connection end 3a and a tool center point 3b (i.e. tip point). The connection end 3a is secured to and coupled with the end effector 2a (i.e. the distal end) of the robot manipulator 2. The tool center point 3b of the tool 3 can be moved to the sensing space 103 defined by the X-axis measurement device 10a, the Y-axis measurement device 10b and the Z-axis measurement device 10c. Namely, the robot manipulator 2 drives the tool 3 to move the tool center point 3b within the sensing space 103.

The calibration operations performed by the tool calibration apparatus 1 is described as following. Firstly, an X-axis measurement process is performed. When the robot manipulator 2 drives the tool 3 to move in a direction along the X-axis, the TCP 3b of the tool 3 is moved within the sensing space 103 in a direction along the X-axis and moved from an original position toward the first measuring plate 11. The TCP 3b of the tool 3 will be in contact with the first measuring plate 11 and the tool 3 pushes the first measuring plate 11 to slide along the first linear rail 13. Under this circumstance, the first sidewall 11c of the first measuring plate 11 exerts a force upon the first spring 14a of the first elastic element 14 and an elastic restoring force is induced on the first spring 14a. In addition, the first measuring part 11b of the first measuring plate 11 is moved within the first sensing groove 12a of the first sensor 12. Consequently, an X-axis displacement parameter of the tool 3 can be measured and acquired by the first sensor 12 according to the displacement of the first measuring part 11b. Thereafter, the robot manipulator 2 drives the tools 3 to move in reverse direction along the X-axis, and the first measuring plate 11 is returned to the original position due to the elastic restoring force of the first spring 14a.

Then, a Y-axis measurement process is performed. When the robot manipulator 2 drives the tool 3 to move in a direction along the Y-axis, the TCP 3b of the tool 3 is moved within the sensing space 103 in the direction along the Y-axis and moved from an original position toward the second measuring plate 21. The TCP 3b of the tool 3 will be in contact with the second measuring plate 21 and the tool 3 pushes the second measuring plate 21 to slide along the second linear rail 23. Under this circumstance, the second sidewall 21c of the second measuring plate 21 exerts a force upon the second spring 24a of the second elastic element 24 and an elastic restoring force is induced on the second spring 24a. In addition, the second measuring part 21b of the second measuring plate 21 is moved within the second sensing groove 22a of the second sensor 22. Consequently, a Y-axis displacement parameter of the tool 3 can be measured and acquired by the second sensor 22 according to the displacement of the second measuring part 21b. Thereafter, the robot manipulator 2 drives the tools 3 to move in reverse direction along the Y-axis, and the second measuring plate 21 is returned to the original position due to the elastic restoring force of the second spring 24a.

Thereafter, a Z-axis measurement process is performed. When the robot manipulator 2 drives the tool 3 to move in a direction along the Z-axis, the TCP 3b of the tool 3 is moved within the sensing space 103 in the direction along the Z-axis and moved from an original position toward the third measuring plate 31. The TCP 3b of the tool 3 will be in contact with the third measuring plate 31 and the tool 3 pushes the third measuring plate 31 to slide along the third linear rail 33. Under this circumstance, the third sidewall 31c of the third measuring plate 31 exerts a force upon the third spring 34a of the third elastic element 34 and an elastic restoring force is induced on the third spring 34a. In addition, the third measuring part 31b of the third measuring plate 31 is moved within the third sensing groove 32a of the third sensor 32. Consequently, a Z-axis displacement parameter of the tool 3 can be measured and acquired by the third sensor 32 according to the displacement of the third measuring part 31b. Thereafter, the robot manipulator 2 drives the tools 3 to move in reverse direction along the Z-axis, and the third measuring plate 31 is returned to the original position due to the elastic restoring force of the third spring 34a.

After the X-axis measuring process, the Y-axis measuring process and the Z-axis measuring process are performed, the displacement variations of the TCP 3b of the tool 3 relative to the end effector 2a of the robot manipulator 2 in the X-Y-Z workspace can be acquired. Consequently, the robot manipulator 2 can control the tool 3 to compensate for the tool inaccuracy according to the deviation.

Figure 3:
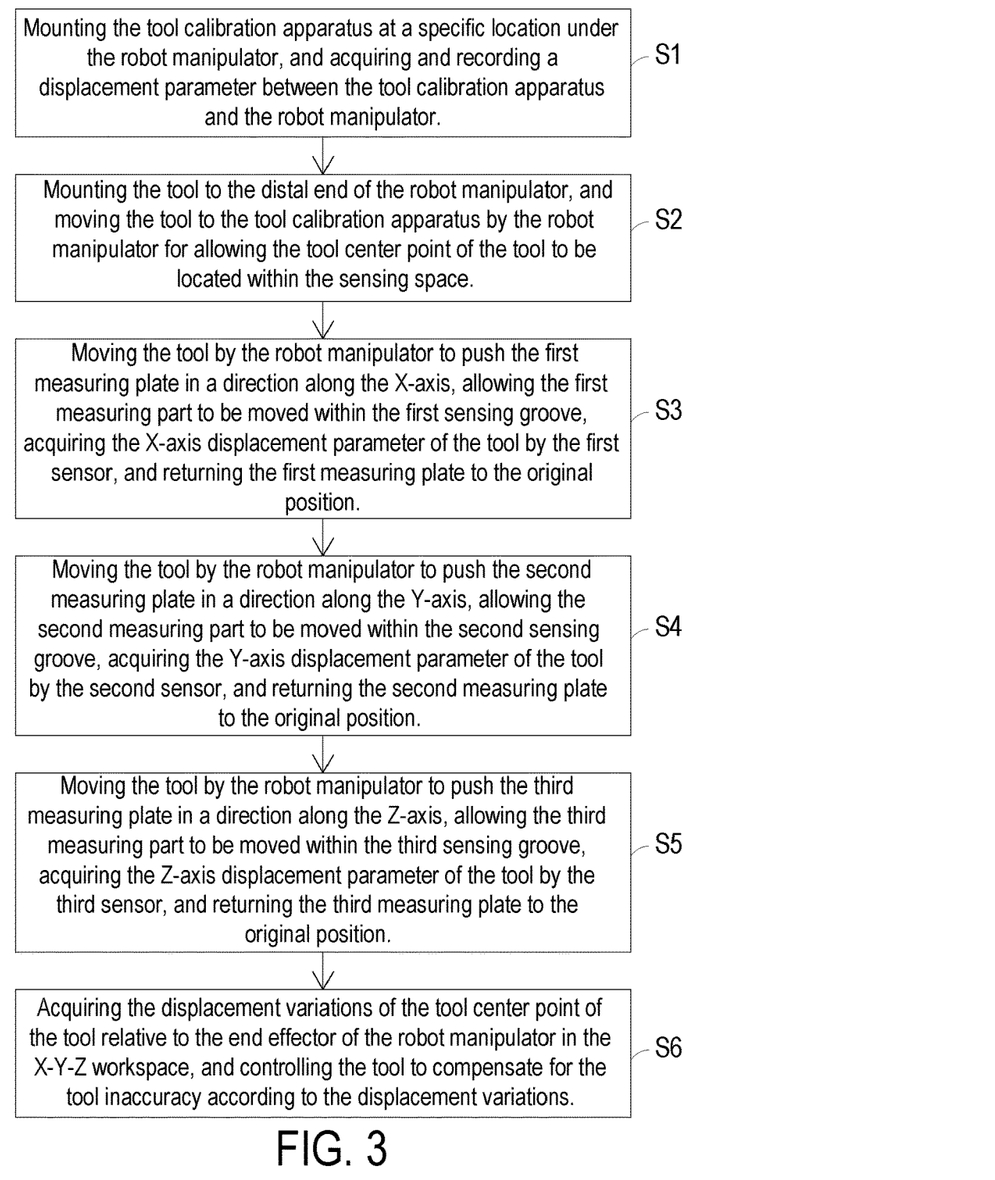
FIG. 3 is a flow chart showing a tool calibration process of a tool mounted to the robot manipulator executed by the tool calibration apparatus of the present invention.

FIG. 3 is a flow chart showing a tool calibration process of a tool mounted to the robot manipulator executed by the tool calibration apparatus of the present invention. Firstly, the tool calibration apparatus 1 is mounted at a specific location under the robot manipulator 2, and a displacement parameter between the tool calibration apparatus 1 and the robot manipulator 2 is acquired (see step S1). Then, the tool 3 is mounted to the end-effector of the robot manipulator 2, and the robot manipulator 2 drives the tool 3 to move to the tool calibration apparatus 1 for allowing the TCP 3b of the tool 3 to be located within the sensing space 103 (see step S2). Thereafter, the robot manipulator 2 drives the tool 3 to move in a direction along the X-axis. The tool 3 is in contact with the first measuring plate 11 and pushes the first measuring plate 11 to move. Under this circumstance, the first measuring part 11b is moved within the first sensing groove 12a, and the X-axis displacement parameter (i.e. the first displacement) of the tool 3 can be measured and acquired by the first sensor 12. After the X-axis displacement parameter of the tool 3 is acquired, the robot manipulator 2 drives the tool 3 to move in reverse direction along the X-axis for allowing the first measuring plate 11 to be returned to the original position (see Step S3).

Then, the robot manipulator 2 drives the tool 3 to move in a direction along the Y-axis. The tool 3 is in contact with the second measuring plate 21 and pushes the second measuring plate 21 to move. Under this circumstance, the second measuring part 21b is moved within the second sensing groove 22a, and the Y-axis displacement parameter (i.e. the second displacement) of the tool 3 can be acquired by the second sensor 22. After the Y-axis displacement parameter of the tool 3 is acquired, the robot manipulator 2 drives the tool 3 to move in reverse direction along the Y-axis for allowing the second measuring plate 21 to be returned to the original position (see Step S4).

Thereafter, the robot manipulator 2 drives the tool 3 to move in a direction along the Z-axis. The tool 3 is in contact with the third measuring plate 31 and pushes the third measuring plate 31 to move. Under this circumstance, the third measuring part 31b is moved within the third sensing groove 32a, and the Z-axis displacement parameter (i.e. the third displacement) of the tool 3 can be acquired by the third sensor 32. After the Z-axis displacement parameter of the tool 3 is acquired, the robot manipulator 2 drives the tool 3 to move in reverse direction along the Z-axis for allowing the third measuring plate 31 to be returned to the original position (see Step S5).

Finally, after the X-axis measuring step, the Y-axis measuring step and the Z-axis measuring step are performed, the displacement variations of the TCP 3b of the tool 3 relative to the end effector 2a of the robot manipulator 2 in the X-Y-Z workspace is acquired, and the robot manipulator 2 can control the tool 3 to compensate for the tool inaccuracy according to the displacement variations (see step S6).

It is to be noted that the structures of the tool calibration apparatus 1 is not limited to the structures as disclosed in the above embodiment. FIGS. 4A to 7B show some alternative embodiments of the tool calibration apparatus 1 of the present invention. In FIGS. 4A to 7B, component parts and elements corresponding to those of the first embodiment of FIGS. 1A and 1B are designated by identical numeral references, and detailed descriptions thereof are omitted.

Figure 4A:
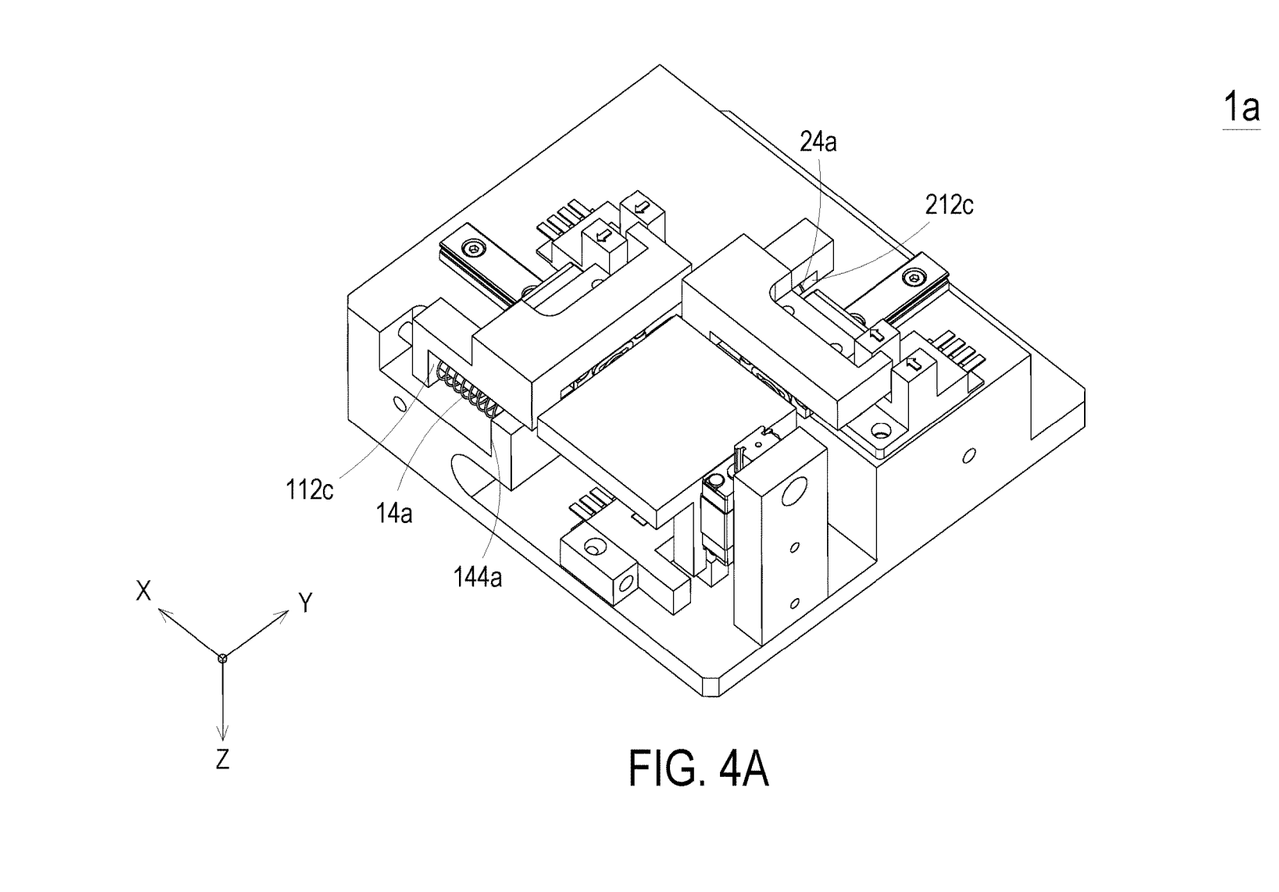
FIG. 4A is a schematic perspective view illustrating a tool calibration apparatus according to a second embodiment of the present invention.
Figure 4B:
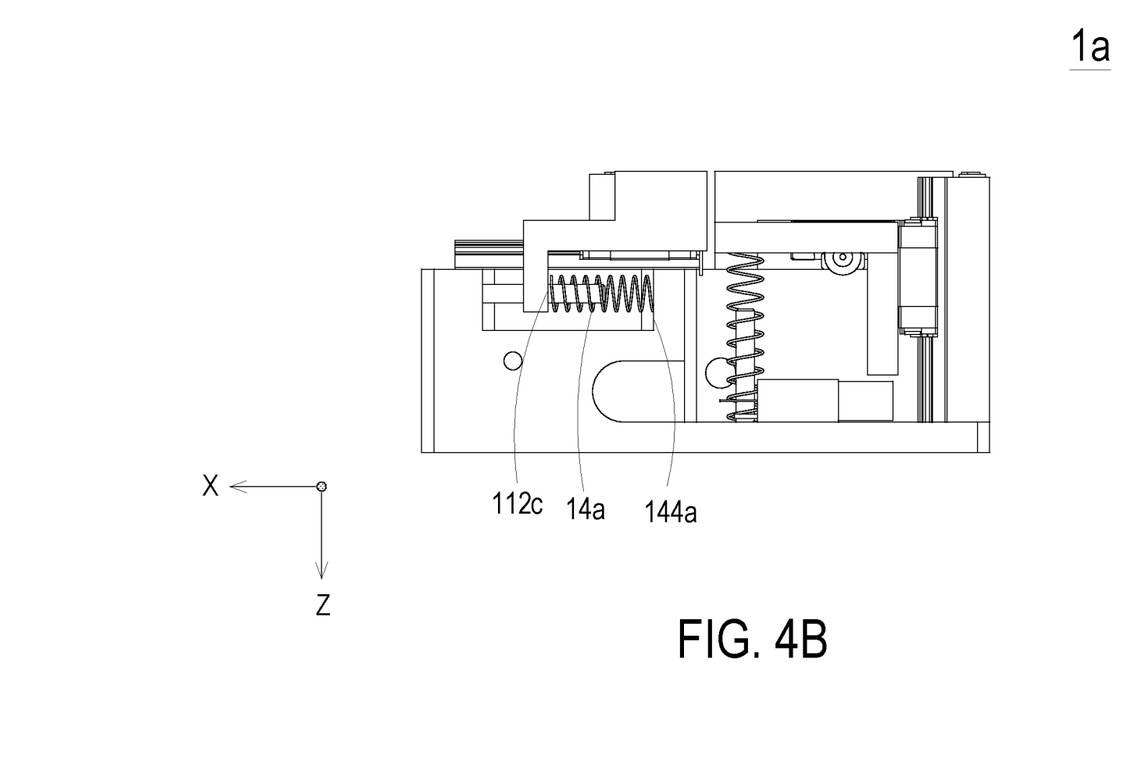
FIG. 4B is a schematic perspective view illustrating the tool calibration apparatus of FIG. 4A in different angle of view.

FIG. 4A is a schematic perspective view illustrating a tool calibration apparatus according to a second embodiment of the present invention, and FIG. 4B is a schematic perspective view illustrating the tool calibration apparatus of FIG. 4A in different angle of view. In comparison with the tool calibration apparatus 1 of FIGS. 1A and 1B, the first spring 14a and the second spring 24a of the tool calibration apparatus 1a of this embodiment are disposed at different locations. One end of the first spring 14a is secured to a first side surface 144a of the recess 101, and the other end of the first spring 14a is secured to an inner surface 112c of the first sidewall 11c. When the first measuring plate 11 is moved in a direction along the X-axis, the first sidewall 11c of the first measuring plate 11 is moved correspondingly. Consequently, the first spring 14a is stretched by the first sidewall 11c of the first measuring plate 11 and an elastic restoring force is induced on the first spring 14a for allowing the first measuring plate 11 to be returned to the original position. In addition, one end of the second spring 24a is secured to a second side surface (not shown) of the recess 101, and the other end of the second spring 24a is secured to an inner surface 212c of the second sidewall 21c. When the second measuring plate 21 is moved in a direction along the Y-axis, the second sidewall 21c of the second measuring plate 21 is moved correspondingly. Consequently, the second spring 24a is stretched by the second sidewall 21c of the second measuring plate 21 and an elastic restoring force is induced on the second spring 24a for allowing the second measuring plate 21 to be returned to the original position.

Figure 5A:
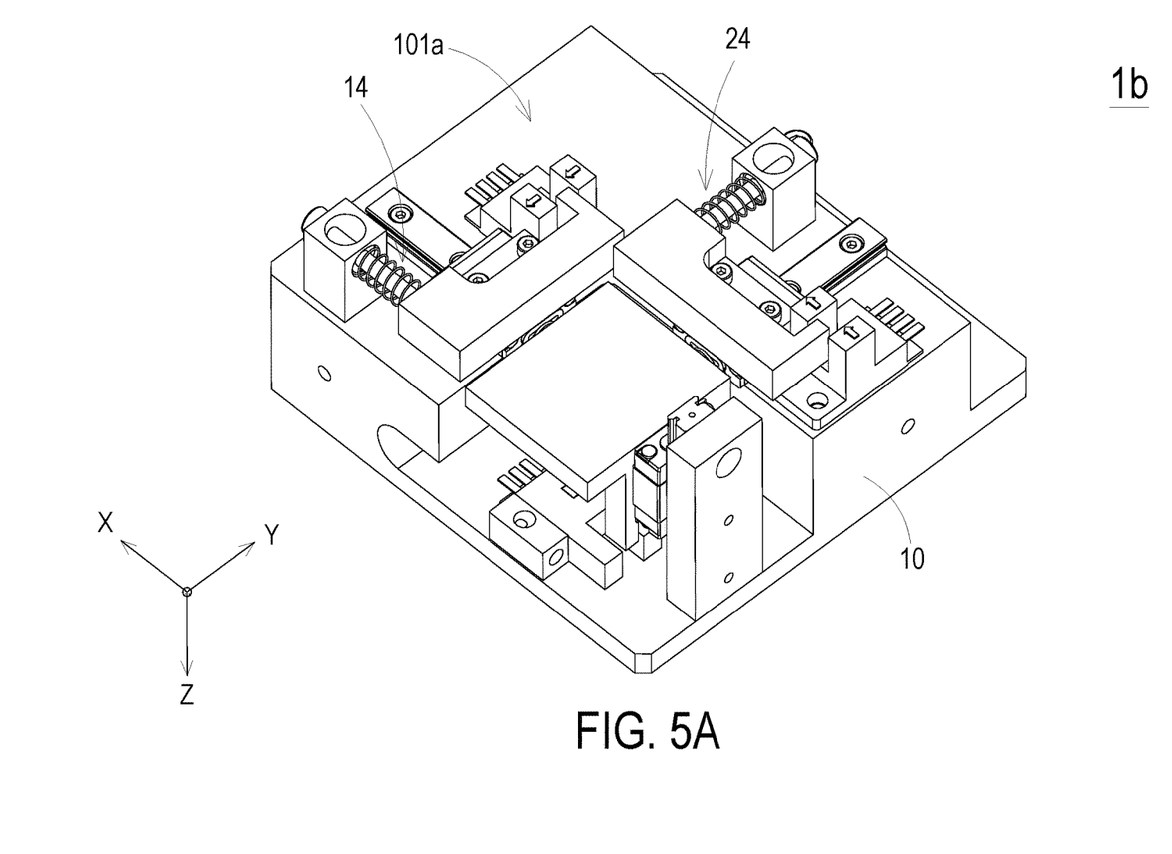
FIG. 5A is a schematic perspective view illustrating a tool calibration apparatus according to a third embodiment of the present invention.
Figure 5B:
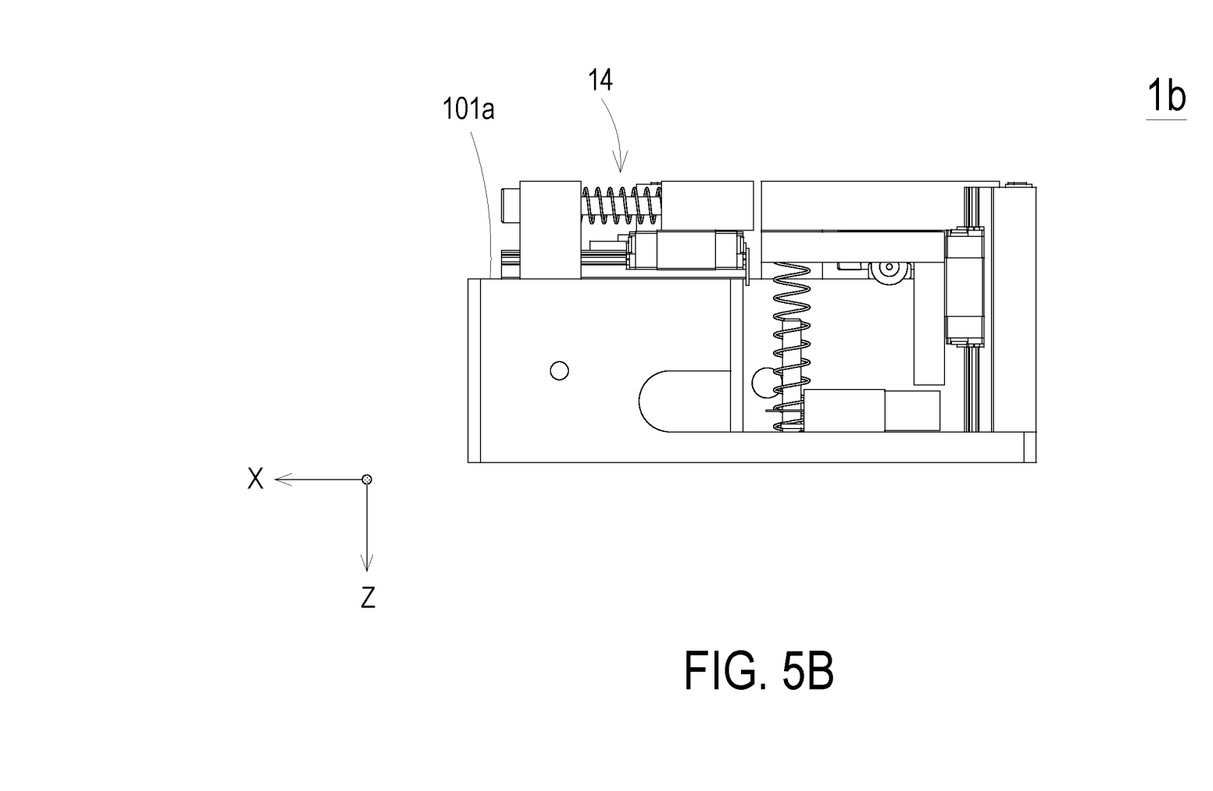
FIG. 5B is a schematic perspective view illustrating the tool calibration apparatus of FIG. 5A in different angle of view.

FIG. 5A is a schematic perspective view illustrating a tool calibration apparatus according to a third embodiment of the present invention, and FIG. 5B is a schematic perspective view illustrating the tool calibration apparatus of FIG. 5A in different angle of view. In comparison with the tool calibration apparatus 1 of FIGS. 1A and 1B, the tool calibration apparatus 1b of this embodiment has no recess formed on the base 10. In addition, the first elastic element 14 and the second elastic element 24 are disposed on the top surface 101a of the base 10, respectively.

Figure 6A:
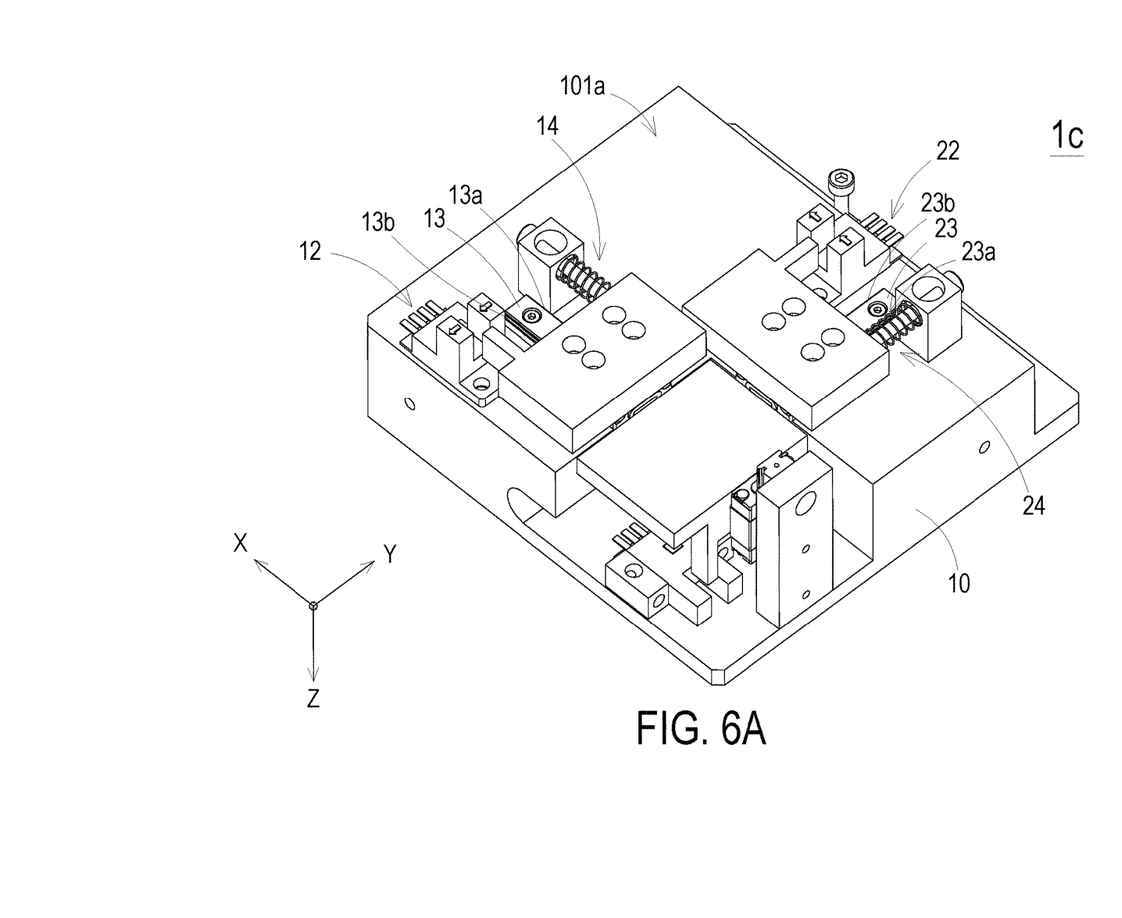
FIG. 6A is a schematic perspective view illustrating a tool calibration apparatus according to a fourth embodiment of the present invention.
Figure 6B:
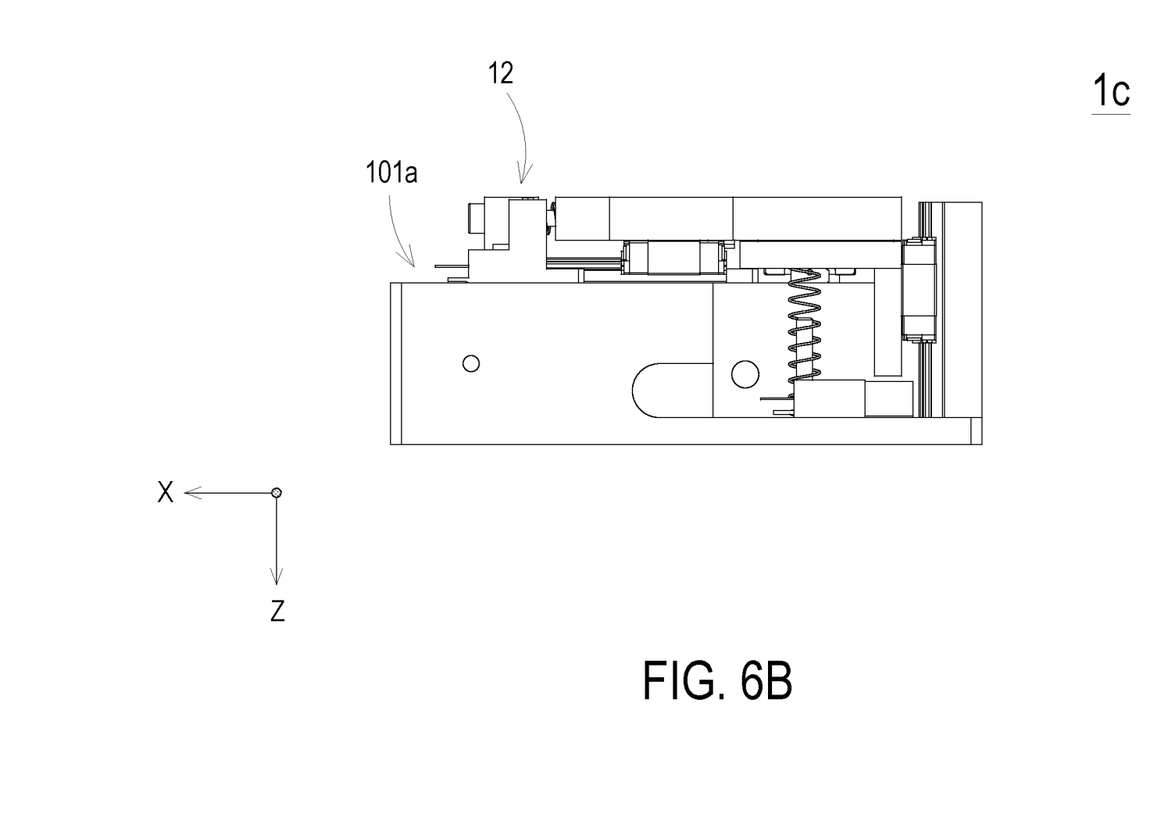
FIG. 6B is a schematic perspective view illustrating the tool calibration apparatus of FIG. 6A in different angle of view.

FIG. 6A is a schematic perspective view illustrating a tool calibration apparatus according to a fourth embodiment of the present invention, and FIG. 6B is a schematic perspective view illustrating the tool calibration apparatus of FIG. 6A in different angle of view. In comparison with the tool calibration apparatus 1 of FIGS. 1A and 1B, the tool calibration apparatus 1c of this embodiment has no recess formed on the base 10. In addition, the first elastic element 14 and the second elastic element 24 are disposed on the top surface 101a of the base 10, respectively. The first sensor 12 is disposed on the second side 13b of the first linear rail 13, and the first elastic element 14 is disposed on the first side 13a of the first linear rail 13. The second sensor 22 is disposed on the second side 23b of the second linear rail 23, and the second elastic element 24 is disposed on the first side 23a of the second linear rail 23.

Figure 7A:
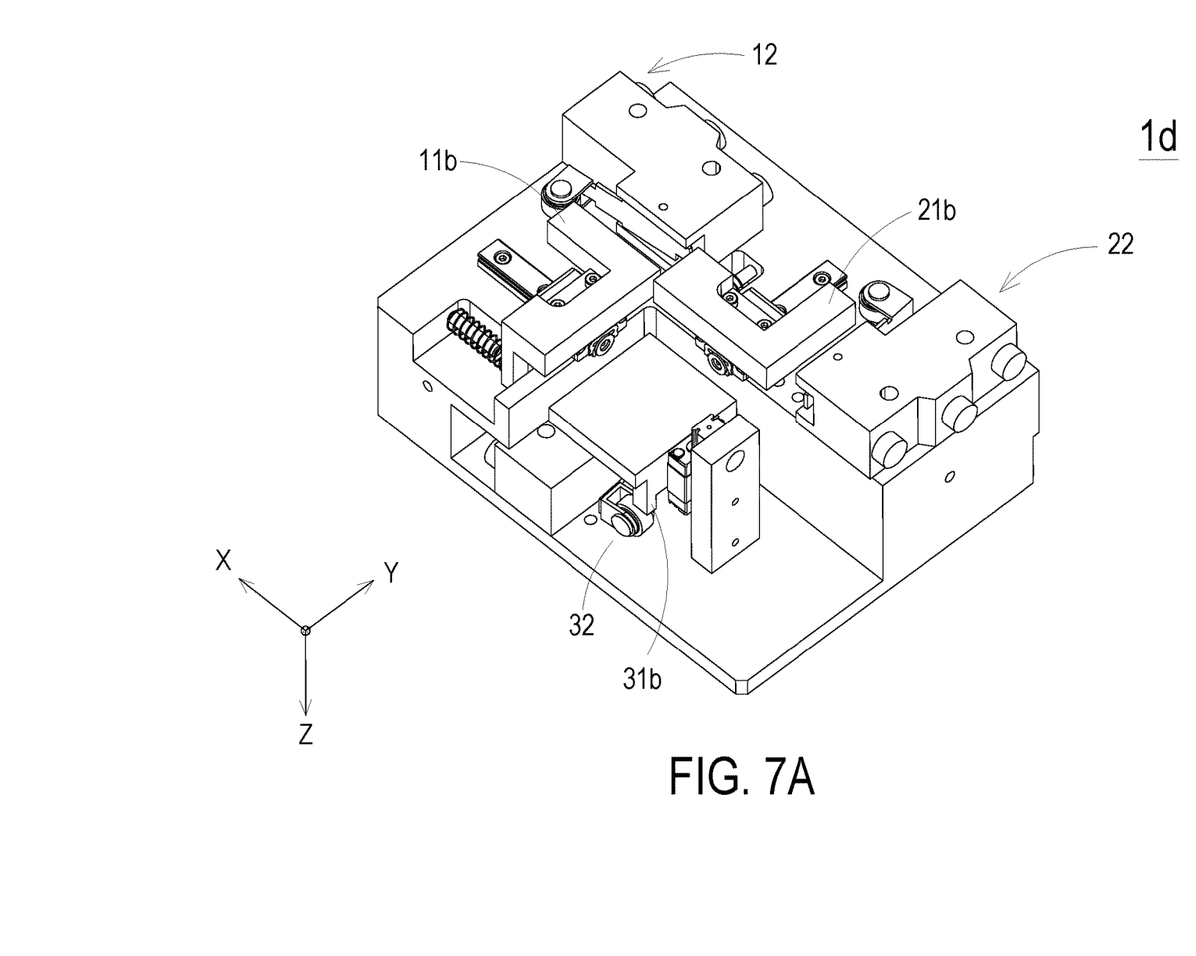
FIG. 7A is a schematic perspective view illustrating a tool calibration apparatus according to a fifth embodiment of the present invention.
Figure 7B:
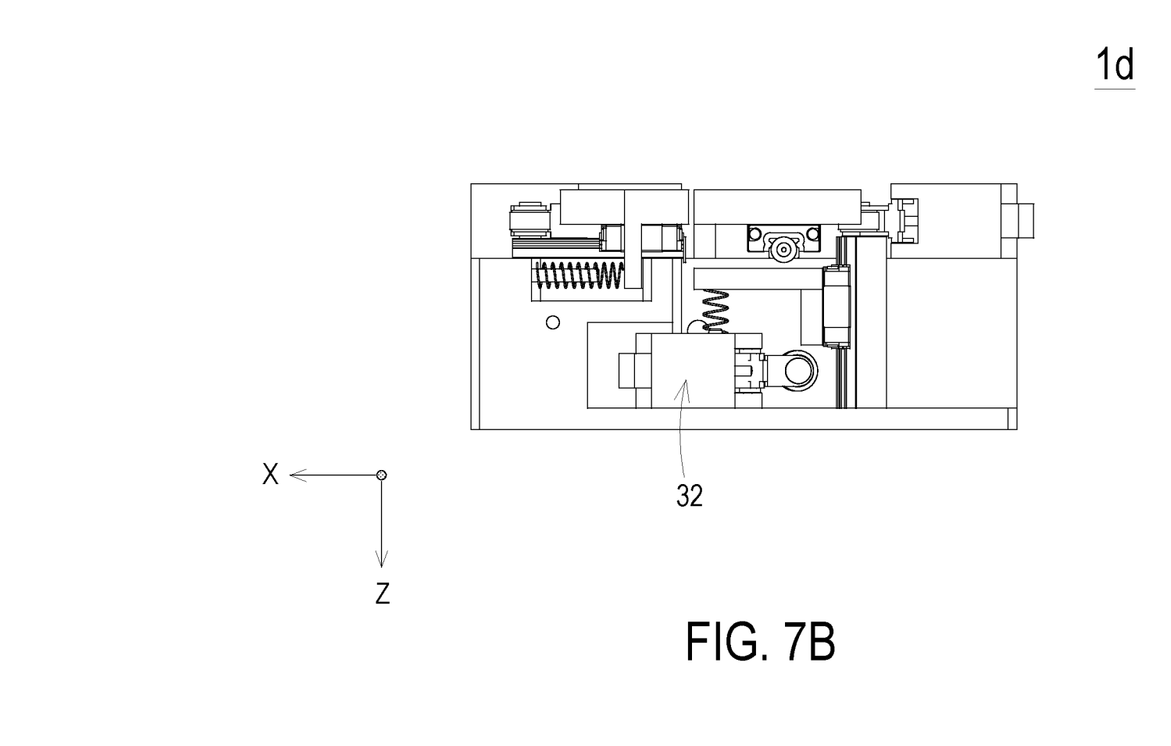
FIG. 7B is a schematic perspective view illustrating the tool calibration apparatus of FIG. 7A in different angle of view.

FIG. 7A is a schematic perspective view illustrating a tool calibration apparatus according to a fifth embodiment of the present invention, and FIG. 7B is a schematic perspective view illustrating the tool calibration apparatus of FIG. 7A in different angle of view. In comparison with the tool calibration apparatus 1 of FIGS. 1A and 1B, the tool calibration apparatus 1d of this embodiment employs different type of sensors. Switch sensors can be used as the first sensor 12, the second sensor 22 and the third sensor 32, respectively. In comparing the switch sensor with the senor used in above embodiments, when the first measuring part 11b, the second measuring part 21b or the third measuring part 31b is moved to contact with the switch sensor, the switch sensor is enabled to measure the displacement of the first measuring part 11b, the second measuring part 21b or the third measuring part 31b. Therefore, the switch sensor can be employed to measure the displacement of the first measuring part 11b, the second measuring part 21b or the third measuring part 31b as same as the sensor used in above embodiments.

From the above descriptions, the present invention provides a tool calibration apparatus of a robot manipulator with reduced cost and capable of being module-assembled. The displacement variations of the tool center point of the tool relative to the end effector of the robot manipulator can be measured and acquired accurately by the inventive tool calibration apparatus, so that the robot manipulator can compensate for tool inaccuracy rapidly to secure the correct operating position of the tool. Consequently, the operating time can be saved as comparing with manual calibration, and high-precision calibration of the tool can be achieved by using the inventive tool calibration apparatus.

While the invention has been described in terms of what is presently considered to be the most practical and preferred embodiments, it is to be understood that the invention needs not be limited to the disclosed embodiment.

What is claimed is:

1. A tool calibration apparatus of a robot manipulator, wherein the robot manipulator comprises a tool and drives the tool to move, the tool calibration apparatus comprising:
   a base comprising a concave;
   an X-axis measurement device disposed on the base and comprising a first measuring plate and a first sensor, wherein the first measuring plate moves in a direction along the X-axis, and the first sensor measures a first displacement of the first measuring plate when the tool drives the first measuring plate to move;
   a Y-axis measurement device disposed on the base and close to one side of the X-axis measurement device and comprising a second measuring plate and a second sensor, wherein the second measuring plate moves in a direction along the Y-axis, and the second sensor measures a second displacement of the second measuring plate when the tool drives the second measuring plate to move; and
   a Z-axis measurement device disposed in the concave and comprising two sides close to the X-axis measurement device and the Y-axis measurement device respectively, a third measuring plate and a third sensor, wherein the third measuring plate moves in a direction along the Z-axis, and the third sensor measures a third displacement of the third measuring plate when the tool drives the third measuring plate to move;
   wherein according to the first displacement, the second displacement and the third displacement acquired by moving the tool in the direction along the X-axis, the Y-axis and the Z-axis, information of a tool center point of the tool is acquired so as to calibrate the tool center point of the tool.

2. The tool calibration apparatus according to claim 1, wherein the X-axis measurement device comprises a first linear rail and a first elastic element, wherein the first measuring plate is slidably moved along the first linear rail, and the first elastic element induces an elastic restoring force when the tool drives the first measuring plate to move; wherein the Y-axis measurement device comprises a second linear rail and a second elastic element, wherein the second measuring plate is slidably moved along the second linear rail, and the second elastic element induces an elastic restoring force when the tool drives the second measuring plate to move; and wherein the Z-axis measurement device comprises a third linear rail and a third elastic element, wherein the third measuring plate is slidably moved along the third linear rail, and the third elastic element induces an elastic restoring force when the tool drives the third measuring plate to move.

3. The tool calibration apparatus according to claim 2, wherein the first measuring plate comprises a first sliding part cooperated with the first linear rail so that the first measuring plate is slidably moved along the first linear rail, wherein the second measuring plate comprises a second sliding part cooperated with the second linear rail so that the second measuring plate is slidably moved along the second linear rail, wherein the third measuring plate comprises a third sliding part cooperated with the third linear rail so that the third measuring plate is slidably moved along the third linear rail.

4. The tool calibration apparatus according to claim 3, wherein the first measuring plate comprises a first measuring part corresponding to the first sensor for sensing the displacement of the first measuring part, wherein the second measuring plate comprises a second measuring part corresponding to the second sensor for sensing the displacement of the second measuring part, wherein the third measuring plate comprises a third measuring part corresponding to the third sensor for sensing the displacement of the third measuring part.

5. The tool calibration apparatus according to claim 4, wherein each of the first sensor, the second sensor and the third sensor is a position sensor, a displacement sensor or a switch sensor.

6. The tool calibration apparatus according to claim 4, wherein the first sensor comprises a first sensing groove aligned with and corresponded to the first measuring part, the second sensor comprises a second sensing groove aligned with and corresponded to the second measuring part, and the third sensor comprises a third sensing groove aligned with and corresponded to the third measuring part.

7. The tool calibration apparatus according to claim 6, wherein the first measuring plate comprises a first sidewall urged against the first elastic element, the second measuring plate comprises a second sidewall urged against the second elastic element, and the third measuring plate comprises a third sidewall urged against the third elastic element.

8. The tool calibration apparatus according to claim 7, wherein the first elastic element comprises a first post and a first spring surrounding around the first post, the second elastic element comprises a second post and a second spring surrounding around the second post, and the third elastic element comprises a third post and a third spring surrounding around the third post.

9. The tool calibration apparatus according to claim 8, wherein the first sensor is disposed on one side of the first linear rail, and the first elastic element is disposed on another side of the first linear rail, wherein the second sensor is disposed on one side of the second linear rail, and the second elastic element is disposed on another side of the second linear rail.

10. The tool calibration apparatus according to claim 8, wherein the base comprises a plurality of recesses, and the first elastic element and the second elastic element are disposed in corresponding recess.

11. The tool calibration apparatus according to claim 1, wherein the first measuring plate and the second measuring plate are close to the two sides of the third measuring plate and are higher than a top surface of the third measuring plate, wherein a sensing space is defined by the first measuring plate, the second measuring plate and the third measuring plate so that the robot manipulator drives the tool to move the tool center point within the sensing space.

\* \* \* \* \*